March 24, 1959     W. R. WOOD     2,879,465
GENERATOR AUTOMATIC FIELD FORCING CIRCUIT
Filed June 20, 1955
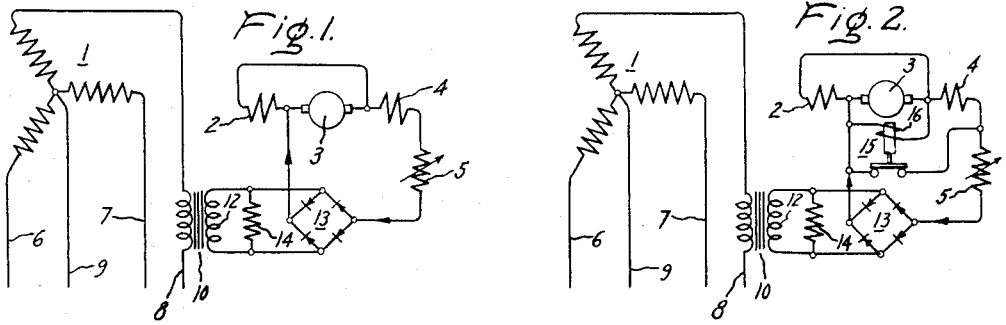
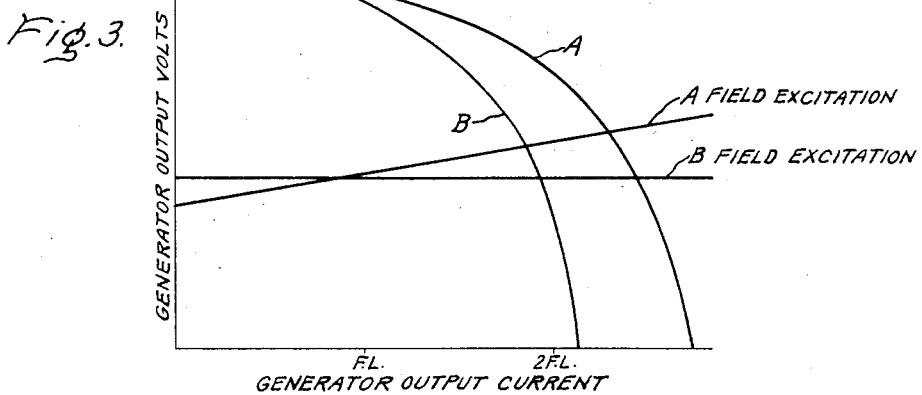
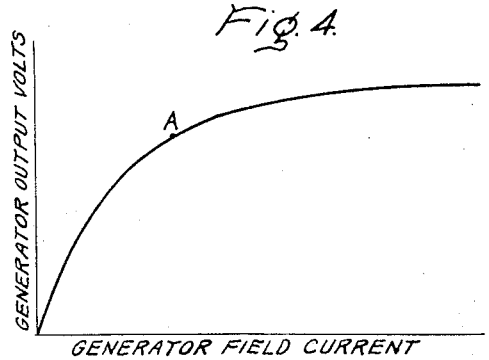
Inventor:
Winchester R. Wood,
by
His Attorney.

United States Patent Office 2,879,465
Patented Mar. 24, 1959

2,879,465

GENERATOR AUTOMATIC FIELD FORCING CIRCUIT

Winchester R. Wood, Schenectady, N.Y., assignor to General Electric Company, a corporation of New York Application June 20, 1955, Serial No. 516,366

4 Claims. (Cl. 322—27)

My present invention relates to a self-regulating synchronous generator having a substantially saturated magnetic circuit which inherently limits the change in output voltage due to a change in load current or in operating temperature.

Broadly speaking, the control of the field excitation of a synchronous generator as a function of the generator output current is known. Such generators are often called upon to drive temporary overloads which are much larger than their continuous rated capacity. The existing systems of control for such applications are relatively costly and complicated and, as a result, the use of self-regulating generators has been limited. Driving motors in many applications have low average torque requirements. However, in order to provide for the frequent heavy overloads of short duration, such as during starting under load, the self-regulating generators powering such motors must have a continuous rating much larger than would be required if adequate overload torque could otherwise be provided.

For example, a satisfactory, simple, inexpensive generator for mounting on a tractor to provide a source of electric power for operating electric motors driving farm machinery, such as hay balers, has not been available prior to my invention.

With the control system of my present invention, a generator having a size corresponding substantially to the average requirement of the load may be utilized. That is, the generator selected can more nearly approach the size necessary to power the root-mean-square of the load cycle, and the high load currents required for high output requirements of short duration can be assured by an automatic increase of the field current of the generator. Accordingly, it is the principal object of my invention to provide a self-regulating generator having certain special design features in combination as will subsequently be described and claimed, wherein special voltage characteristics are obtained to provide increased load current under overload conditions.

Another object of my invention is to provide a simple, rugged, low cost generator having a voltage control system with no moving parts and providing minimum voltage regulation with maximum voltage output under overload conditions.

Further objects and advantages of my invention will become apparent and my invention will be better understood from the following description with reference to the accompanying drawing, and the features of novelty which characterize my invention are specifically set forth in the claims annexed to and forming a part of this specification.

In the drawing,

Fig. 1 is a schematic showing of one embodiment of my invention.

Fig. 2 is a schematic showing of a modified form of my invention.

Figs. 3 and 4 are performance curves illustrating my invention.

In Fig. 1, there is shown a synchronous generator or alternator 1 of a conventional type, having a field 2, it being understood that the generator may be of the rotating field or armature type, as desired. An exciter 3 having a field coil 4 provided for impressing an excitation voltage across generator field 2. A variable resistor 5 is provided in the field circuit of the exciter 3. Output load lines of generator 1 are indicated by the numerals 6, 7 and 8 respectively, and a ground line 9 in a usual manner.

As shown, load line 8 is provided with current transformer 10. A rectifier 13 is connected in parallel across the output of the secondary 12 of the current transformer 10 with a resistance 14. Rectifier 13 is preferably of the full-wave type, and is hereinafter more fully described. The output terminals of the rectifier are connected in series with the exciter field 4 and armature 3 in a direction such that an increase in the output of the rectifier 13 serves to boost the exciter output voltage.

The resistor 5 provides for the adjustment of the exciter field to obtain the desired output voltage of generator 1 at no-load conditions.

It is of primary importance that a portion of the magnetic circuit of the A.-C. generator 1 is substantially saturated. Referring to Fig. 4, this will occur when the magnetic circuit has a degree of saturation above the "knee" on the saturation curve, or not less than indicated at point A. Without such saturation the voltage output of the generator is extremely sensitive to variations in the field current and to armature reaction. Thus, any change in field current, in such a machine, caused by a change in resistance of the generator field or exciter field due to variation in operating temperature, would cause large changes in the output voltage of the generator 1, either in loaded or unloaded condition. In addition, any change in the load power factor would change the armature reaction ampere turns in the axis of the generator field and thus would have a large effect upon the terminal voltage of the generator. By providing a saturated or substantially saturated field structure, I maintain the generator terminal voltage at a substantially constant value over the range of normal operation, with the result that a variation of the generator field current causes only a small change in terminal voltage of the generator.

On the other hand, the magnetic field circuit for the exciter 3 is designed to operate on the linear portion of its saturation curve or below the "knee" of its saturation curve, so that its output voltage varies substantially linearly with the voltage impressed across the exciter field to obtain a high amplification of its input signal. In this way, the voltage impressed across generator field 2 and therefore the current passing therethrough is linearly increased with an increase of exciter field current.

In order to obtain the satisfactory operation of the field forcing circuit of generator 1, I provide a current transformer 10 which delivers a secondary voltage proportional to the load current in line 8. As will be understood, an increase of load current through line 8 will increase the voltage at the output of the current transformer 12. However, if the value of resistor 14 is zero, the secondary voltage at the output of the secondary 12 is zero under all load current conditions. On the other hand, if the resistor 14 is omitted, the core of the current transformer 10 will saturate rapidly at low values of load current. Therefore, in order to obtain a voltage output of the transformer secondary 12 which is linear with respect to load current, it is essential that resistor 14 be of a value to insure that the secondary voltage rises linearly with load current through line 8 and that saturation of the current transformer 10 does not occur until a predetermined overload is obtained.

From the circuit shown in Fig. 1, it will be apparent that the output terminals of rectifier 13 are in series with exciter field 4. This connection is essential so that all the current resulting from an increase in load current, and therefore an increase in secondary voltage of current transformer 10, is passed through the rectifier 13, converted into a D.-C. current, and passes through the exciter field 4. However, in order to insure a voltage build-up in the exciter, means must be provided to prevent the forward resistance of the rectifier elements of rectifier 13, preventing the residual magnetism of the exciter from initiating a voltage build-up without desensitizing the system.

In the embodiment shown in Fig. 1, I have found that copper oxide and small germanium rectifiers can be used satisfactorily in this arrangement because of their very low initial forward resistance. By initial forward resistance is meant the initial value of resistance which must be overcome in a rectifier before any current can begin to pass therethrough. In the modification shown in Fig. 2, in which like parts are identified by like numerals, I have provided a normally closed relay 15 which is connected to bypass the rectifier 13 during starting. In this arrangement, after the voltage of the exciter reaches a prescribed level, the relay coil 16, which is connected across the armature of exciter 3, is energized sufficiently to hold the relay in an open position, so that all of the rectified current from rectifier 13 passes through the exciter field 4.

In operation, resistor 5 is adjusted so that just enough current flows in the exciter field circuit to give the desired no-load voltage across the generator terminals. When the generator 1 starts delivering current to the load, the current transformer 10 produces secondary voltage across the input terminals of rectifier 13 proportional to the load current. Full-wave rectifier 13 converts this voltage into a pulsating D.-C. voltage, and boosts the self-excitation of the exciter 3 to increase the current through the A.-C. generator field 2 as indicated in Fig. 3. This increased field immediately bucks the effect of armature reaction to maintain the generator output voltage under overload conditions. This armature reaction under momentary overload conditions is prevented from greatly reducing the generator field flux by a corresponding increase in generator field current provided by the field forcing arrangement of my invention.

Referring now to Fig. 3, I have shown the comparative results of tests which show the improvement of my invention. Curve B shows the output performance of a saturated, 3-phase, self-regulating generator having 12% inherent regulation at 0.8 power factor and constant excitation. Curve A represents the same generator under identical conditions, except that it incorporates the improvement of my invention. It will be noted that the use of my invention more than doubles the generator output voltage at twice full load. Since motor torque varies as the square of the applied voltage, the incorporation of my invention in a generator results in an output voltage which will cause a driven motor to develop more than four times the overload torque as when powered by the same generator without my invention. Thus, by a simple and inexpensive field forcing circuit, having no moving parts, in which a generator having a saturated magnetic circuit is combined with an exciter having high amplification and with a highly sensitive means for increasing the exciter armature voltage linearly in proportion to an increase in load current, an A.-C. generator is provided which has the advantages of a compound series field, without the disadvantages of such a series field.

While I have illustrated and described my invention as applied to a 3-phase alternator, it will be understood by those skilled in the art that this is merely illustrative of my invention, and further modifications will occur to those skilled in the art. I desire it to be understood, therefore, that I do not wish to be limited to the particular showings, and I intend in the appended claims to cover all modifications which do not depart from the spirit and scope of my invention.

What I claim as new and desire to secure by Letters Patent of the United States is:

1. A self-regulating generator having an armature for supplying current to a load circuit, a separate exciter connected to provide the excitation voltage for the field coils of the generator and arranged to substantially saturate the magnetic field structure of said generator during all operating conditions, a current transformer in the load circuit of said generator, a full-wave rectifier connected to receive the output of the secondary winding of said current transformer, a resistor across the secondary winding of said transformer to provide a secondary voltage having a substantially linear relationship with the load current of said generator, the output terminals of said full-wave rectifier being connected in the field circuit of said exciter to pass all the rectifier current through an exciter field coil to boost the exciter output voltage upon an increase in load current, and means for initiating a voltage build-up in said exciter.

2. A self-regulating generator having an armature for supplying current to a load circuit, a separate exciter connected to provide excitation voltage for the field coils of the generator and arranged to substantially saturate the magnetic circuit of said generator during operation, a current transformer in the load circuit of said generator, a full-wave rectifier connected to receive the output of the secondary winding of said current transformer, a resistor across the secondary winding of said transformer to provide a secondary voltage having a substantially linear relationship with the load current of said generator, the output terminals of said full-wave rectifier being connected to pass all the rectified current through an exciter field coil to boost the exciter output voltage upon an increase in load current, and a normally closed relay in parallel with the output terminals of said full-wave rectifier to shunt the rectifier during the starting of the generator to initiate an output voltage build-up from said exciter, and means for opening said relay when the exciter voltage reaches a predetermined level.

3. A self-regulating alternator having minimum voltage regulation and maximum overload current capacity, the alternator having an armature connected to a load circuit, field coils arranged to provide excitation flux for the alternator, and a magnetic field structure constructed and arranged to be substantially saturated during all operating conditions; an exciter for supplying excitation voltage to the alternator field coils; a current transformer responsive to the current passing through said load circuit, a secondary circuit for said current transformer comprising a resistor across the output terminals of the current transformer to maintain the current transformer in an unsaturated condition until a predetermined overload current of the alternator is reached and a full-wave rectifier, the output terminals of said rectifier being connected in series with the field coils of the exciter to pass all the rectified current therethrough to increase the current in the field coils of said alternator in proportion to the increase in load current.

4. A self-regulating polyphase alternator having an armature for connection to a load circuit, field coils for said alternator, and a magnetic field structure associated with said field coils and constructed and arranged to be substantially saturated during all operating conditions; a separate exciter having a magnetic field structure constructed and arranged to be substantially unsaturated over a predetermined range of load currents of the alternator; a current transformer having a primary winding connected in the load circuit of the alternator; a full-wave rectifier connected across the secondary winding of the transformer; means for connecting the secondary winding of the transformer to the rectifier to provide a substantially linear relationship between the output voltage of the transformer and the alternator load current over a predetermined range of load currents of the alternator, said rectifier having output terminals connected to energize the exciter so as to boost the output voltage of the exciter armature by passing all the rectified current through an exciter field, the output terminals of the exciter being connected to impress a voltage across the field coils of the alternator to provide an excitation current therethrough which varies substantially linearly with the load current of the alternator.

References Cited in the file of this patent

UNITED STATES PATENTS

| | | |
|---|---|---|
| 2,451,958 | Kilgore et al. | Oct. 19, 1948 |

FOREIGN PATENTS

| | | |
|---|---|---|
| 94,846 | Sweden | Mar. 1, 1939 |
| 900,112 | Germany | Dec. 21, 1953 |